(12) United States Patent
Murkin

(10) Patent No.: US 10,814,425 B2
(45) Date of Patent: Oct. 27, 2020

(54) COMPACT LASER MACHINING HEAD

(71) Applicant: John Murkin, Chesterfield, VA (US)

(72) Inventor: John Murkin, Chesterfield, VA (US)

( * ) Notice: Subject to any disclaimer, the term of this patent is extended or adjusted under 35 U.S.C. 154(b) by 378 days.

(21) Appl. No.: 15/844,122

(22) Filed: Dec. 15, 2017

(65) Prior Publication Data
US 2019/0009364 A1 Jan. 10, 2019

Related U.S. Application Data

(60) Provisional application No. 62/434,774, filed on Dec. 15, 2016.

(51) Int. Cl.
| | |
|---|---|
| *B23K 26/14* | (2014.01) |
| *D05B 37/10* | (2006.01) |
| *B23K 26/06* | (2014.01) |
| *B23K 26/08* | (2014.01) |
| *B23K 26/03* | (2006.01) |
| *B23K 26/36* | (2014.01) |
| *B23K 26/064* | (2014.01) |
| *B23K 26/12* | (2014.01) |

(52) U.S. Cl.
CPC .......... *B23K 26/147* (2013.01); *B23K 26/032* (2013.01); *B23K 26/064* (2015.10); *B23K 26/0643* (2013.01); *B23K 26/0648* (2013.01); *B23K 26/08* (2013.01); *B23K 26/128* (2013.01); *B23K 26/1482* (2013.01); *B23K 26/36* (2013.01); *D05B 37/10* (2013.01)

(58) Field of Classification Search
USPC ............ 219/121.73–121.75, 121.78, 121.84
See application file for complete search history.

(56) References Cited

U.S. PATENT DOCUMENTS

| | | | | |
|---|---|---|---|---|
| 3,749,878 A | * | 7/1973 | Sullivan ................. | B23K 26/10 219/121.67 |
| 4,324,972 A | * | 4/1982 | Furrer .................... | B23K 26/02 219/121.63 |
| 4,402,574 A | * | 9/1983 | McConnel ......... | B23K 26/1435 219/121.75 |
| 4,439,663 A | * | 3/1984 | Lilly, Jr. ................ | A24C 5/007 219/121.7 |

(Continued)

*Primary Examiner* — Paul R Durand
*Assistant Examiner* — Andrew P Bainbridge
(74) *Attorney, Agent, or Firm* — Royal W. Craig; Gordon Feinblatt LLC

(57) ABSTRACT

An improved laser-machining head unit for fabric comprising a diagonal mirror assembly with a tubular sleeve extending downward to an internally threaded distal tip. An annular adapter is provided with an externally-threaded male fining at one end and an internally-threaded receptacle at an opposing end. The externally-threaded male fitting of the adapter is adjustably screw-threaded into the internally threaded distal tip of the tubular sleeve. A laser nozzle has a frusto-conical tip and an annular collar Cm attachment to the adapter, the collar being externally threaded and fixedly screw-inserted into the internally-threaded receptacle of the adapter. In addition, there is a gas inlet affixed to the collar of the laser nozzle for introducing gas at a 90-degree angle thereto. The screw-adjustable configuration ensures proper alignment at all times of the lens, the beam and the nozzle aperture, and air stream.

19 Claims, 2 Drawing Sheets

(56) References Cited

U.S. PATENT DOCUMENTS

| | | | | |
|---|---|---|---|---|
| 4,564,736 | A * | 1/1986 | Jones | B23K 26/0096 |
| | | | | 219/121.6 |
| 4,608,480 | A * | 8/1986 | Bizot | B23K 26/389 |
| | | | | 219/121.7 |
| 4,689,467 | A * | 8/1987 | Inoue | B23K 10/00 |
| | | | | 219/121.6 |
| 4,997,250 | A * | 3/1991 | Ortiz, Jr. | B23K 26/06 |
| | | | | 219/121.75 |
| 5,968,037 | A * | 10/1999 | Rizoiu | B23K 26/146 |
| | | | | 606/13 |
| 7,320,594 | B1 * | 1/2008 | Rizoiu | A61B 18/201 |
| | | | | 433/29 |
| 9,821,409 | B2 * | 11/2017 | Sugiyama | B23K 26/38 |
| 10,639,740 | B2 * | 5/2020 | Yoshimura | B23K 26/14 |
| 2019/0009364 | A1 * | 1/2019 | Murkin | B23K 26/1482 |

* cited by examiner

COMPACT LASER MACHINING HEAD

CROSS-REFERENCE TO RELATED APPLICATION(S)

The present application derives priority from U.S. provisional application Ser. No. 62/434,774 filed Dec. 15, 2016.

BACKGROUND OF THE INVENTION

1. Field of the Invention

The present invention relates to laser machining equipment and, more particularly, to a more compact laser machining head element that allows easier, more consistent and more reliable focal adjustment for fabric applications.

2. Description of the Background

Manufacturers of performance apparel, uniforms, swimwear, and sports accessories use various methods to apply a variety of indicia, such as text, numbers, logos, graphics, and other indicia, to garments and textiles for decoration and identification, among other things. Common application technologies include silk-screening, screen-printing, sonic welding, direct embroidery, and heat activated transfers. Most all approaches require cutting and/or etching of fabric. This can be automated using a digitally-controlled laser cutting system with a variable-intensity laser beam capable of high speed movement. Commercial laser-cutting and engraving stations includes a cutting bed upon which the fabric blank is placed and having an X-Y plotter with articulating laser, head thereon. However, commercial laser-cutting and engraving stations are more adapted for cutting and engraving flat panels of wood or other uniform substrates. They are less adept at fabric which is more variable in height and surface texture when seated in the cutting bed. This becomes clear after a brief description of the head element.

FIG. 1 illustrates a conventional laser machining head element 1 that receives laser light from a source and redirects it by a diagonal mirror assembly 12 through a main lens cylinder 14 into a nozzle 16, the latter having a gas inlet 18 for assist gas. The lens cylinder 14 includes a telescoping height-adjustment tube 15 containing an internal focusing lens and mount. Note that a focusing lens is located in the sleeve 14 high above the cutting led, resulting in a 3-4" laser beam path that must be aligned and focused. This is fine for uniform panels where only minor process calibration is required and when a course adjustment will suffice. Thus, a set knob 13 can be loosened to allow manual telescoping-setting of height-adjustment tube 15 to set the nozzle 16 at the optimal height setting and focal length. However, some fabric cutting/etching applications are more difficult because very slight focusing/alignment errors on fabric causes yellowing. For this application more frequent, consistent and accurate focusing is required. With the foregoing design applied to fabrics an operator must spend considerable time adjusting the mirrors of diagonal mirror assembly 12 to direct the beam perfectly through the center of the nozzle 16 opening. Failure to do this results in the air flow from gas inlet 18 being uneven even around the laser beam, which results in heavy yellow edging on all laser-cut fabrics. Even after the diagonal mirror assembly 12 is properly adjusted the alignment creeps over time and yellowing of product results. To be more specific the design flaws that cause the foregoing are as follows:

The diagonal mirror assembly 12 has a 90-degree downward directed sleeve into which the main lens cylinder 14 fits by a poor interference fit. Even after being tightened by a set screw 13 this union may not be perfectly aligned with a perfectly directed laser beam.

The lower air nozzle 18 is also a poor fit to the main lens cylinder 14, held in place with three grub screws. Over a short period these screws tend to score the lens, cylinder 14 making it difficult to seat the nozzle 18 cleanly on the cylinder 14.

In addition, the air nozzle 18 shoots air up into the cylinder 14 at an angle. Because of the poor fit of the lower nozzle 18 to the cylinder 14 air is lost through the fitting. Also the air blows impurities onto the lens making cleaning a frequent requirement.

It would be greatly advantageous to provide a laser machining head element that alleviates the foregoing problems and in which all the lower;nozzle components are always be in correct alignment with the laser beam.

SUMMARY OF THE INVENTION

It is, therefore, an object of the present invention to provide a laser machining head element that allows easier, more consistent and more reliable focal adjustment.

It is another object to provide a laser machining head element in which the lens element sits inside the lower nozzle assembly rather than, the main lens cylinder, thereby decreasing the focal length, making it easier to adjust, and providing a greater window of operation.

It is still another object to provide a laser machining head element in which the air blows in horizontally and does not shoot back up into the cylinder.

It is another object to provide a laser machining head element comprising components attached via screw fit for proper alignment at all times of the lens, the beam and the nozzle aperture.

It is still another object to provide a laser machining head element with a nozzle aperture having a larger diameter allowing the beam to cleanly exit the nozzle at all positions across the bed without hitting the aperture It is another object to provide a laser machining head element that makes cleaning the lens simple and convenient.

And it is another object of the present invention to provide a laser machining head element that can be manufactured cost effectively.

According to the present invention, the above-described and other objects are accomplished with a laser-machining head unit comprising a diagonal mirror assembly having a housing with a laser inlet and an orthogonal laser outlet, and a reflecting mirror adjustably seated inside the housing for directing laser light from the inlet into the outlet. A tubular sleeve extends downward from the outlet of the diagonal mirror assembly and has an internally threaded distal tip. In addition, an annular adapter is provided with an externally-threaded male fitting at one end and an internally-threaded receptacle at an opposing end. The externally-threaded male fitting of the adapter is adjustably screw-threaded into the internally threaded distal tip of the tubular sleeve. A laser nozzle is inserted into the adapter receptacle, the laser nozzle having frusto-conical tip with a small aperture at one end and an annular collar with a large aperture at the other. The annular collar is externally threaded and fixedly, screw-inserted into the internally-threaded receptacle of the adapter. In addition, there is a gas inlet affixed to the collar of the laser nozzle for introducing gas at a 90-degree angle thereto.

BRIEF DESCRIPTION OF THE DRAWINGS

Other objects, features, and advantages of the present invention ill become more apparent from the following detailed description of the preferred embodiments and certain modifications thereof when taken together with the accompanying drawings in which.

DETAILED DESCRIPTION OF THE PREFERRED EMBODIMENT

The present invention is an improved laser machining head element 20 that ensures perfect alignment and eliminates yellowing, and yet makes lens cleaning simple and convenient.

Figure 2:
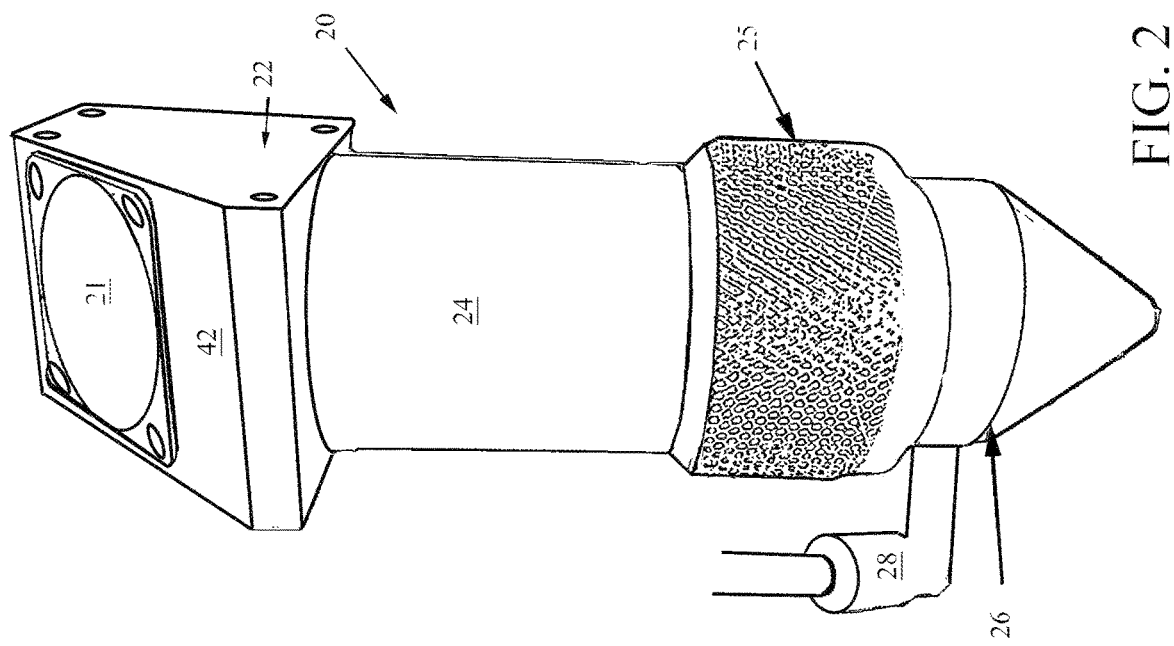
FIG. 2 is a front perspective view of the laser machining head element 20 according to an embodiment of the invention.
Figure 1:
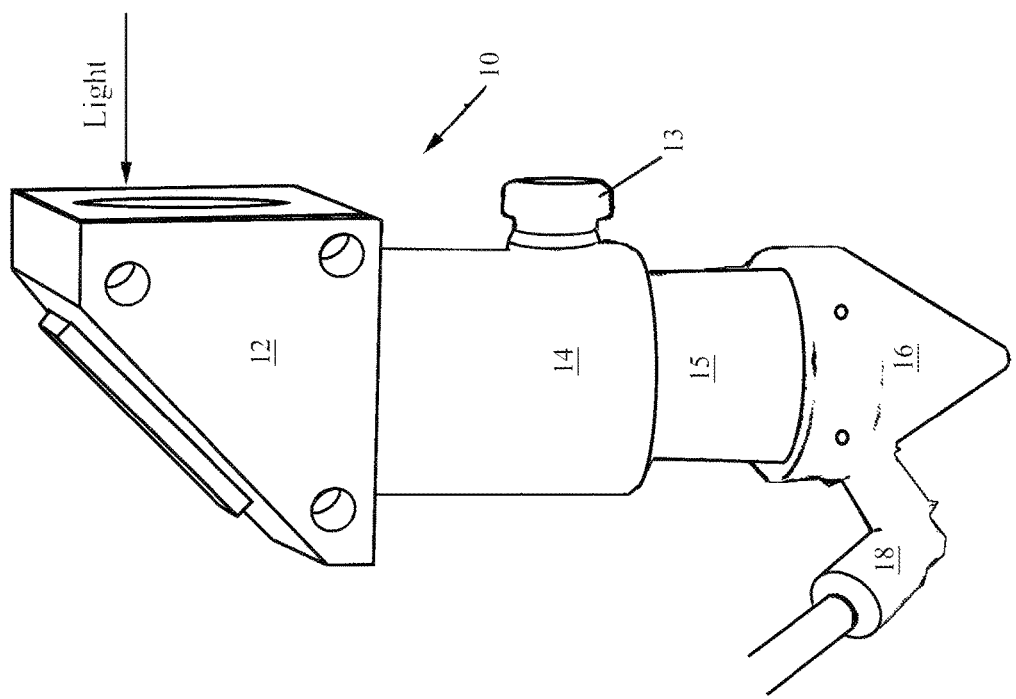
FIG. 1 is a front perspective view of a prior art laser machining head element 10.

FIG. 2 is a front perspective view of the laser machining head element 20 according to an embodiment of the invention. In a traditional manner the laser machining head element 20 receives laser light from a source and redirects it by a diagonal mirror assembly 22 into a nozzle 26 having a gas inlet 28. The diagonal mirror assembly 22 includes a housing 42 that positions a reflecting mirror 21 at a 90 degree angle with respect to an inlet opening and an outlet opening. The beam is reflected off the adjustable diagonal 21 seated inside housing 42 and downward through a hollow tubular sleeve 23.

Figure 3:
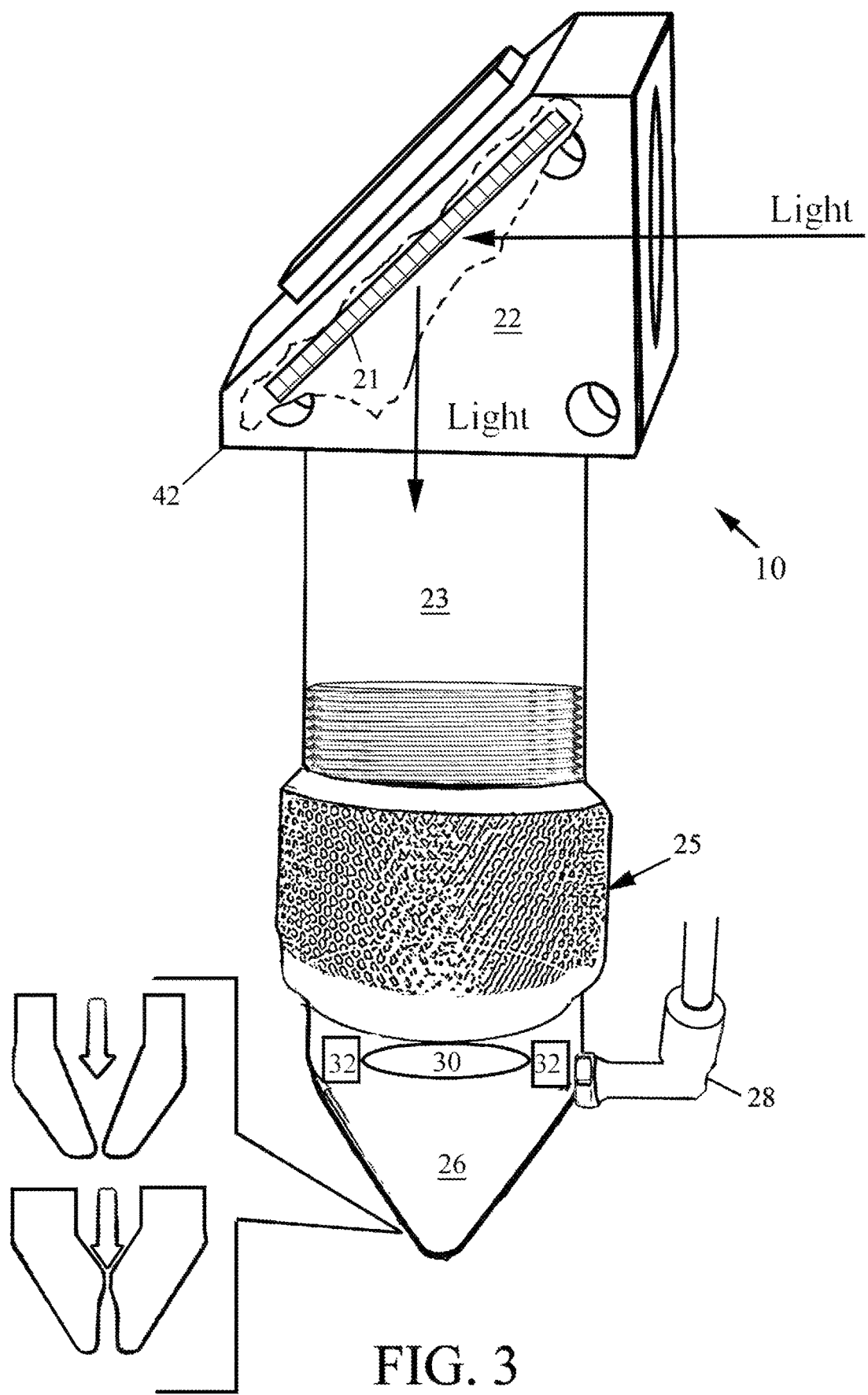
FIG. 3 is a side cross-section of the laser machining head element 20 as in FIG. 2.

FIG. 3 shows the internal configuration. The reflecting mirror 21 redirects the laser light down through downwardly-extending sleeve 23 Sleeve 23 is cylindrical along its length and may be permanently or removably attached to the housing of mirror assembly 22 as a matter of design choice. In a preferred embodiment sleeve 23 is 35 mm long and has an internal diameter of 22 mm. Importantly, sleeve 23 is internally or externally threaded along its distal tip with adjustment threads preferably having a pitch diameter within a range $R_1$ of from 0.2 mm to 0.8 mm, and most preferably within a range $R_1$ of from 0.2 mm to 0.5 mm. An adapter 25 is adjustably-screwed onto the threaded sleeve 23 extending from the mirror assembly 22, and may be micro-adjusted in or out as desired. The adapter 25 likewise has an internally or externally threaded upper neck with matching adjustment threads within said pitch range $R_1$. The adapter 25 has a screw-threaded bottom orifice into which the nozzle 26 screws directly (this is a fixed non-adjustable screw-attachment). The thread pitch of the adapter 25 bottom orifice is preferably within a range $R_2$ of from 0.2 mm-1 mm and is optimally 0.5 mm. Preferably, the exterior surface of adapter 25 is textured to provide a finger grip. The threaded sleeve 23 is hollow: there is no focusing lens assembly as per the prior art.

In accordance with the present invention, and as best seen in FIG. 3, the nozzle 26 includes an upper cylindrical collar containing the primary focusing lens assembly 30 and mount 32, and is equipped with a 90 degree gas inlet 28 directed at the lens assembly 30. The conical tip of nozzle 26 may be configured as an industry standard sonic nozzle (see inset top). Alternatively the conical tip of nozzle 26 may be configured as a supersonic minimum length nozzle (inset bottom). The lens mount 32 may include conventional focusing/alignment optics which focuses the laser beam for passage through the nozzle 26 tip and to the cutting bed below, where the laser beam forms a point focus on the target. For example, the laser output may be focused to a spot using a single plano-convex lens mounted in an adjustable lens bed. In certain embodiments, the lens mount 32 is either air-cooled or water-cooled to reduce heating of the nozzle 26.

The gas stream from 90-degree gas inlet 28 impinges transverse to the laser beam to cause particles from the workpiece being machined to be blown away laterally from the outlet opening of the nozzle 26 and thus removed.

Given the foregoing configuration, the focusing lens(es) is/are located in the nozzle 26 effectively shortening the focal length to the nozzle, e.g., resulting in a 1-2" beam path through nozzle 26 that must be aligned and focused. This makes it easier for fabric applications. Moreover, the nozzle 26 height may be conveniently set by adjusting the distance that the adapter 25 is screwed into the threaded sleeve 23 extending from the mirror assembly 22. This screw-adjustment serves to maintain the precise height of the nozzle 26 and makes adjustment easier. This is important for fabric applications where the need for focusing/calibration is more acute, and more frequent and accurate focusing is required. The screw-fit assembly ensures the laser beam is always properly aligned with the lens assembly 30 and the nozzle opening eliminating the need to adjust the mirror 21 in the diagonal mirror assembly 22 for lens-to-beam-to-nozzle alignment. Preferably, a comparatively small 50 mm focal length lens is used, the lower focal length of the lens assembly 30 affording a much wider operating window and uniform laser settings across all fabric backing combinations.

In use, it was found that the optimum nozzle 26 height for most fabric backing combinations is 5 mm from the top of the fabric. One skilled in the art will understand that most cutting beds have a 1 mm or more variation across their surface and the 5 mm height setting is able to compensate for that variation adequately. If yellowing still occurs at the 5 mm setting it can be eliminated by lowering the nozzle two rotations (down to 4 mm).

It is important to ensure that the nozzle 26 is always screwed firmly into the adapter 25 and not loosened to lower the nozzle height. An operator should always adjust the nozzle height by adjusting the adapter 25 depth within the sleeve 23. If desired, a small amount of thread tape applied to the adapter 25 thread will create a tighter fit between the adapter 25 and the nozzle 26.

One skilled in the art will readily appreciate that the laser machining head 20 according to the invention has a smaller focal length and compact structure. Moreover, the nozzle 26 may be easily removed for lens assembly 30 cleaning. In addition, since the air front inlet 28 blows in horizontally it will not shoot back up into the sleeve 23.

It should be apparent that the foregoing results in a laser machining head element 20 that maintains proper alignment at all times between the lens assembly 30, the beam and the nozzle 26 aperture. This has been a description of the present invention and, the preferred embodiment

I claim:

1. A laser-machining head unit, comprising:
   a diagonal mirror assembly having a housing with a laser inlet and an orthogonal laser outlet, a reflecting mirror seated inside the housing for directing laser light from said inlet into said outlet;
   a tubular sleeve in optical communication with said mirror assembly and extending downward from the outlet of said diagonal mirror assembly to a threaded end; and
   a laser nozzle in optical communication with said tubular sleeve and having a screw-threaded cylindrical tubular inlet leading to a frusto-conical tip for directing laser light along a linear path from said inlet onto a workpiece, and
   a focusing lens and lens mount inside the laser nozzle;
   a tubular adapter screw-threaded at one end and adjustably attached thereby to the threaded end of said tubular sleeve and screw-threaded at another end and adjustably attached thereby to the inlet of said laser nozzle;
   a gas inlet to the laser nozzle for introducing gas flow perpendicularly to said linear path onto said focusing lens and lens mount.

2. The laser-machining head unit according to claim 1, further comprising two focusing lenses seated in the lens mount inside the laser nozzle.

3. The laser-machining head unit according to claim 1, wherein said laser nozzle is adjustably attached to said tubular sleeve.

4. The laser-machining head unit according to claim 3, wherein said laser nozzle is adjustably attached to said tubular sleeve by said adapter.

5. The laser-machining head unit according to claim 4, wherein said adapter is fixedly attached to said laser nozzle and screw-adustably attached to said tubular sleeve for screw-adjustment along said linear path.

6. The laser-machining head unit according to claim 5 wherein said adapter is externally screw-threaded at said other end and screw-threaded thereby into said laser nozzle.

7. The laser-machining head unit according to claim 5, wherein said adapter is internally screw-threaded at said other end and screw-threaded thereby onto said laser nozzle.

8. The laser-machining head unit according to claim 5, wherein said adapter is screw-threaded to said laser nozzle by screw-threads having a pitch diameter within a range of from 0.2 mm to 0.8 mm.

9. The laser-machining head unit according to claim 5, wherein said adapter is screw-threaded to said laser nozzle by screw-threads having a pitch diameter within a range of from 0.2 mm to 0.5 mm.

10. The laser-machining head unit according to claim 4, wherein said laser nozzle is fixedly attached to said adapter.

11. The laser-machining head unit according to claim 10, wherein said laser nozzle is fixedly screw-threaded to said adapter.

12. The laser-machining head unit according to claim 5, wherein a height of said laser nozzle relative to a workpiece may be adjusted by rotating the adapter.

13. A laser-machining head unit, comprising:
   a diagonal mirror assembly having a housing with a laser inlet and an orthogonal laser outlet, a reflecting mirror seated inside the housing for directing laser light from said inlet into said outlet;
   a tubular sleeve in optical communication with said mirror assembly and extending downward from the outlet of said diagonal mirror assembly to an annular sleeve end configured with adjustment screw threads;
   an adapter ring having a first end configured with mating screw threads and adjustably engaged to the screw threads of the annular sleeve end; and
   a laser nozzle fixedly attached to an opposing end of said adapter and having an inlet and an interior channel leading to a frusto-conical tip for directing laser light along a linear path from said inlet onto a workpiece
   at least one focusing lens and lens mount inside the laser nozzle; and
   a gas inlet to the laser nozzle configured to introduce gas flow perpendicular to said linear path.

14. The laser-machining head unit according to claim 13, comprising a pair of focusing lenses mounted in said laser nozzle.

15. The laser-machining head unit according to claim 14, wherein said adapter is externally screw-threaded at said other end and screw-threaded thereby into said laser nozzle.

16. The laser-machining head unit according to claim 14, wherein said adapter is internally screw-threaded at said other end and screw-threaded thereby onto said laser nozzle.

17. The laser-machining head unit according to claim 13, wherein said at least one focusing lens is adjustably mounted.

18. The laser-machining head unit according to claim 17, wherein a height of said laser nozzle relative to a workpiece may be adjusted by rotating the adapter.

19. The laser-machining head unit according to claim 13, wherein said at least one focusing lens consisting of a single focusing lenses seated inside the laser nozzle.

* * * * *